128,478

UNITED STATES PATENT OFFICE.

CHARLES LOUIS FLEISCHMANN, OF WASHINGTON, DISTRICT OF COLUMBIA.

IMPROVEMENT IN PROCESSES OF FORMING BLOCKS AND SLABS FROM GREEN GRASSES FOR FUEL AND OTHER PURPOSES.

Specification forming part of Letters Patent No. 128,478, dated July 2, 1872.

Specification describing an Improved Process of making a compact Fuel and Building Material of Grasses or other Plants, invented by CHARLES LOUIS FLEISCHMANN, of the city of Washington, in the District of Columbia.

Take grasses or other plants which have been cut before they have reached perfect maturity, and pass them while in a green state between compressing-rollers, so as to crush and flatten the leaves and stems and thus form a compact mass of vegetable fibers, which, when thoroughly dry, furnishes a good fuel and even a useful material for building and fencing.

The saccharine, albuminous, and glutinous substances expressed from the leaves and stems serve as cementing medium of the fibers.

The fuel can be made more effective by incorporating with the plants coal-dust, turf, resinous, bituminous, or fatty substances.

Claim.

I claim as my invention—

The process of making sheets, boards, or blocks of grasses or other plants by compressing them while in a green state, substantially as and for the purpose herein set forth.

CHARLES LOUIS FLEISCHMANN.

Witnesses:
   WM. G. HENDERSON,
   JAMES S. GRINNELL.